April 29, 1952        H. G. ANDRÈ        2,594,714
METHOD OF FORMING ELECTRIC ACCUMULATORS
Filed Dec. 4, 1950        2 SHEETS—SHEET 1
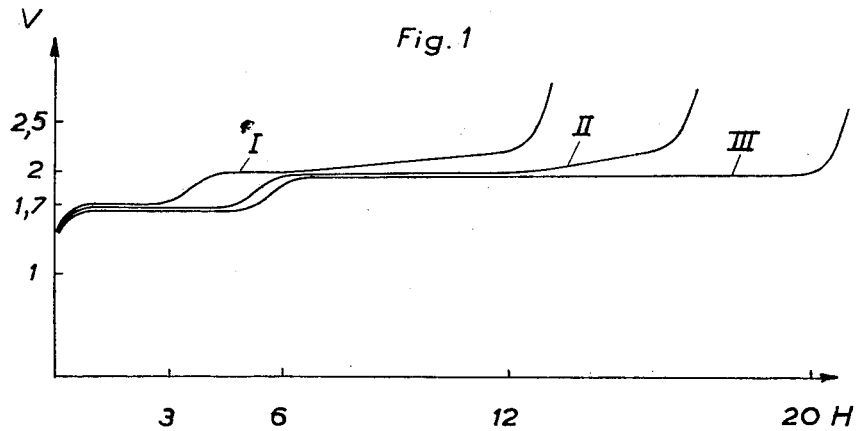
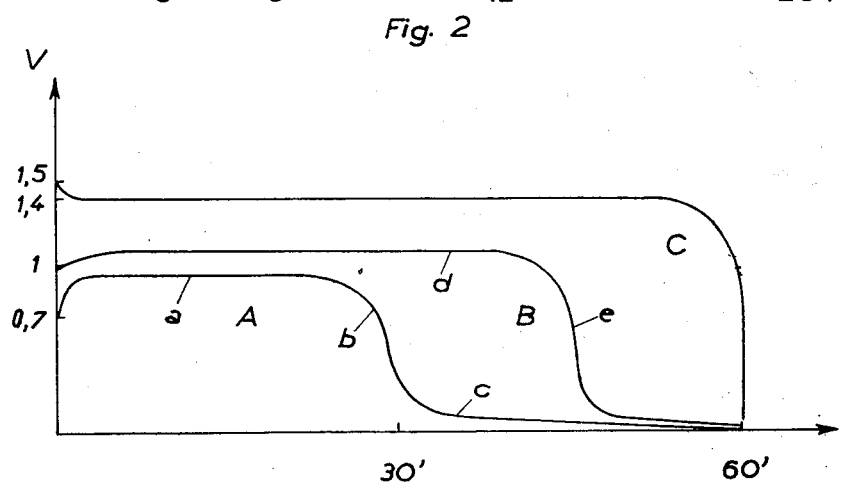
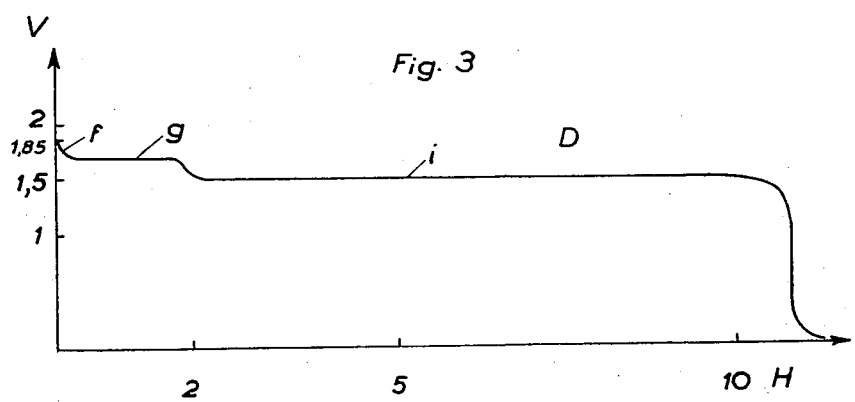
INVENTOR:
HENRI G. ANDRE
BY Karl F. Ross
AGENT

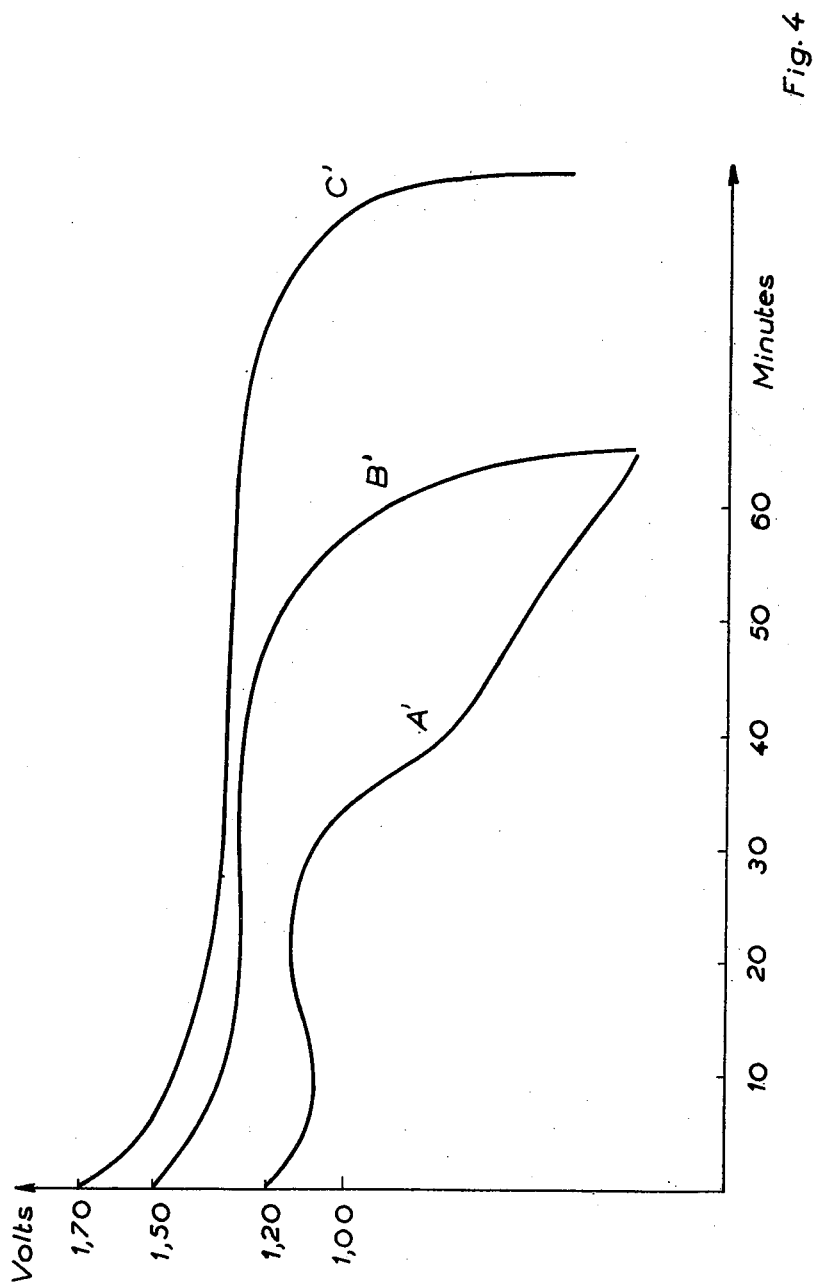

Patented Apr. 29, 1952

2,594,714

UNITED STATES PATENT OFFICE 2,594,714

METHOD OF FORMING ELECTRIC ACCUMULATORS

Henri Georges André, Montmorency, France, assignor to Yardney International Corp., New York, N. Y., a corporation of New York Application December 4, 1950, Serial No. 198,945
In France December 6, 1949

3 Claims. (Cl. 136—34)

This invention relates to the production of electric accumulators. It is more particularly directed to accumulators of the type wherein the electro-chemical reactions consist of oxidations and reductions of active substances, such as the silver-zinc accumulators developed by the applicant.

In this type of accumulator, the silver and the zinc are immersed in an alkaline electrolyte and the active substances of opposite polarity are separated by diaphragms or separator members made of semi-permeable material impregnated with an alkaline electrolyte and are applied under pressure against said diaphragms.

The manufacture and, more specifically, the so-called formation of such accumulators poses very delicate problems the correct solution of which enables to a large extent the successful and practical commercial use of the units.

It has been already suggested to form such accumulators by a sequence of charging and discharging steps, the latter being conducted very slowly. This procedure has made possible the production of silver-zinc accumulators adapted for the so-called "insoluble negative electrode" type of operation, that is to say, operating by a succession of reductions and oxidations, owing to the conversion of the zinc initially introduced into the unit in its usual commercial form, namely that of a massive plate, into zinc hydroxide possessing a highly divided structure, adapted subsequently to preserve such structure and to permit of the successful development of the electrochemical processes therein.

Again the same method continued to be applied following the proposal, in the production of such an accumulator, to start from a zinc compound already initially in a divided form, such as zinc oxide, rather than starting from massive zinc.

However, the above-defined formation process is comparatively very time-consuming, first because the discharges have to be carried out very slowly, and secondly because a great many charges and discharges or cycles have to be made, until an accumulator is obtained which may be satisfactorily placed on the market.

The present invention provides a method of forming such accumulators whereby a practically operable accumulator may be obtained quickly and easily, the resulting accumulator being such as to take advantage in full of the inherent capacity of its constituent substances while having a long useful life as well as being easy and economical to produce. More particularly, it is an object of the present invention to provide a method which will promote the aforedescribed conversion of the zinc into a highly subdivided compound, namely, its hydroxide, during formation of the battery.

According to the invention, the formation of such an accumulator, which still proceeds by a sequence of charge and discharge or cycles, is so conducted that the discharge or discharges are effected at a very rapid rate, contrary to the procedure hereabove mentioned.

It has been discovered, surprisingly enough, that if, in the formation process of a silver-zinc or equivalent accumulator wherein the electrochemically active substances, and more specifically the negative substance, is or are in a finely divided state, a charge is followed by a rapid discharge, the amount of electricity made available is much greater, and the accumulator is more fully formed, than if the discharge was caused to proceed slowly.

This discovery is probably connected with the unstable character of the silver peroxide formed during the charge, the silver peroxide, if the discharge be conducted slowly, being spontaneously converted in a purely chemical manner, i. e. without evolving any useful amount of electric power, and hence without advancing the formation of the accumulator; if on the other hand the discharge is conducted rapidly, the silver peroxide is converted by an electro-chemical process, evolving an useful electric current, into less highly oxidized silver compounds which are subsequently in turn converted to silver by an electro-chemical process, all these conversions contributing their share to the formation of the accumulator.

Such a quick discharge moreover causes a temperature elevation in the active substances, which fact in itself is favorable to the formation of the accumulator.

One practical way of carrying this invention into effect will now be described by way of example, as relating to the formation of a silver-zinc accumulator of the type specified. In the accompanying drawing:

Fig. 1 is a diagram showing a number of curves relating to formation charges;

Fig. 2 is a diagram showing curves relating to formation discharges;

Fig. 3 shows an accumulator-discharge curve subsequent to formation;

Fig. 4 is a diagram showing discharge curves for a modification.

The invention is illustratively applied to an accumulator unit which comprises, within a container, a multiplicity of alternating positive and negative electrodes, the positive active substance being powdered silver and the negative substance being powdered zinc oxide.

The active substances of opposite polarity are applied under pressure against opposite sides of diaphgrams or separators made of cellophane and the whole assembly is impregnated with an alkaline electrolyte, for instance a 50%-concentration water solution of potassium hydroxide. The thickness of the separators is so selected as to allow the proper accomplishment of the ion exchanges owing to the electrolyte in which they are impregnated. The relative thicknesses of active substances and separators, and the length of the container, are such that the pressure of active substances against the separators will approximate 20 kilograms per square decimeter. Accumulators of this type have been described at length in a number of prior applications filed by me, for example in my U. S. patent application Ser. No. 738,702 filed April 1, 1947, for: "Silverzinc accumulator with an insoluble negative electrode and invariable electrolyte"; in my U. S. patent application Ser. No. 66,291 filed December 20, 1948, for: "Improvements in zinc-silver accumulators"; in my U. S. patent application Ser. No. 66,292 filed December 20, 1948, for: "Improvements in zinc-silver accumulators"; in my U. S. patent application Ser. No. 134,155 filed December 21, 1949, for: "Improvements relating to electric accumulators"; and in my U. S. patent application Ser. No. 98,432 filed June 11, 1949, for: "Electrode for an electro-chemical energy generator."

The above-defined unit is subjected to a first charging step, by connecting its terminals to a source of direct or rectified current. As a result of this charge, the zinc oxide is reduced to zinc and the silver is converted to oxidized compounds. The charge is allowed to proceed until the major part of the silver has been converted to silver peroxide. It is stopped when this conversion has been practically completed, as evidenced by an increase in the voltage across the unit.

Fig. 1 graphically represents the unfolding of the charging process. In this diagram, the time, in hours, is plotted in abscissae, while the voltage across the accumulator terminals is plotted in volts in ordinates. The charge is conducted relatively slowly, the current which is made to flow being equivalent to about ½₀ of the nominal current capacity of the accumulator; i. e. the current, in amperes, is represented by an amount which is one twentieth of the amount representing the nominal capacity in ampere-hours.

It is found that the voltage, which starts from a value approximating 1.5 volt, first rises very sharply and then becomes stabilized at a value approximating 1.7 volt. Then after a certain lapse of time, which in this example is about 3 hours, the voltage again rises rather sharply and assumes a value of about 2 volts, whereat it becomes stabilized for a relatively long time. At the end of this time, which is about 3 hours in the example described, or about 6 hours from the beginning of the charging operation, the voltage begins to rise, first at a comparatively slow rate, then more and more rapidly. The end of the charging operation is indicated by just this rapid increase in the voltage. In the example described, the charge is stopped about 6 hours from the beginning of the slow increase, or about 12 hours from the beginning of the charge.

The first discharge, which is a formative discharge, is then effected. During the very first stage of this discharge, the potassium hydroxide dissolves a small amount of zinc, becoming converted into potassium zincate, as stated in my U. S. patent application Ser. No. 109,231 filed August 8, 1949, for: "Method of production of an accumulator."

After this first stage, the subsequent conversions consist exclusively in reductions and oxidations. The silver peroxide is converted electro-chemically into less highly oxidized silver oxides, especially silver protoxide, then into silver, and simultaneously the zinc is converted into oxidized zinc compounds, especially the oxide and the hydroxide. It has been found that a desirable value for the current corresponding to this formative discharge is the current represented, in amperes, by an amount substantially equal to the amount representing, in ampere-hours, the nominal capacity of the said accumulator. Thus, already at this initial discharge, an amount of electricity is obtained which is about 50% or 60% of the nominal capacity of the accumulator. This result is remarkable and clearly distinguishes the present method from the prior method wherein the initial formative discharge supplied a considerably lower amount of electricity.

The curve A of Fig. 2 represents this initial formative discharge, in one embodiment of the invention. In this figure, the abscissae represent time, in minutes, and the ordinates are voltages across the accumulator terminals, in volts.

The curve representing the first discharge shows that the voltage, starting from a value of about 0.7 volt, first increases very quickly to reach a value of about 1.0 volt, which it retains for slightly less than one half-hour. Then it falls off rapidly during a few minutes, and, after having reached a value of a few tenths of a volt, it further continues to decrease, but much more slowly. It assumes a practically zero value at the end of about 60 minutes, at which time the accumulator is completely discharged.

Presumably the portion $a$ of the curve A, which precedes the sharply falling portion $b$, corresponds to the electro-chemical conversion of the silver peroxide into less highly oxidized compounds, and the portion $c$ which follows the said sharply falling portion corresponds to the conversion of these less highly oxidised compounds into silver.

This formative discharge is effected immediately after the formative charge, so as to take full advantage of the conversion of the silver peroxide.

The second formative charge is next performed, the charge current being adjusted to a value approximating that used in the first charge. This second charge is stopped as soon as the reversible electro-chemical conversions are completed, as evidenced by a rapid increase in the voltage across the accumulator terminals.

Then the second formative discharge is immediately effected, the discharge current being adjusted to a value approximating that defined for the first discharge, and so on repeatedly.

In Fig. 1, the curve II represents the fourth formative charge of the accumulator. The voltage, starting from a value of about 1.5 volts, quickly attains a stable value slightly lower than 1.75 volts, and stays there for about five hours. Then it rises rather rapidly up to a value of about 2 volts, from which it very slowly rises up to 2.2 volts. This value, which in this fourth cycle is reached at the end of about 16 hours of charging, corresponds to the end of the charge. If the charge were continued further, the curve would rise very sharply.

The next formative discharge which is carried out immediately, this being the fourth discharge, is represented by the curve B of Fig. 2. This curve is similar in general shape to the curve A, but presents a flat portion $d$ much longer than the flat portion $a$ of curve A, the portion $d$ lasting about 45 minutes; the voltage then drops very sharply, as shown by the portion $e$, and then drops much more slowly, until complete exhaustion of the accumulator occurs at the end of about one hour's discharge.

The curve III of Fig. 1 represents a normal or service charging operation, that is, as applied to a fully formed accumulator. If it is effected, as in the example shown, by using a charge current equal to that used in the formative charges, this curve will possess a shape similar to that of the preceding curves, except that its flat portion will be longer. Complete charging corresponds to a higher amount of electricity flowing through the accumulator. In the example, the full charging period is 20 hours. This example relates to the tenth charge of the accumulator.

Experience has shown that, after the eighth formative cycle, the accumulator is fully formed. From this time on, the charge may be conducted at a much quicker rate, and it is only for purposes of comparison that Fig. 1 shows a curve corresponding to a 20-hour charge period.

The tenth discharge of the accumulator is represented in Fig. 2 by the curve C. The voltage, initially 1.5 volts, decreases very quickly and stabilizes at a practically constant value of 1.4 volts. After the electrochemical conversions are completed, the voltage falls off very sharply. The accumulator is now discharged.

It is also for a purpose of comparison that this normal or service discharge curve is herein made to correspond with a discharge time of about one hour, which is the recommended time for a formative discharge. It should be understood that once the formation has been achieved, the discharge may be conducted just as quickly or as slowly as may be desired, including even a practically indefinite period during which the accumulator may be stored in open-circuited condition.

By way of example, Fig. 3 illustrates a discharge diagram corresponding to one tenth of the nominal capacity. The time in hours is plotted in abscissae, and the voltage in volt in ordinates. The initial voltage is 1.85 volts; after a very small but sharp initial decrease (portion $f$), the voltage stabilizes for about two hours, as shown by the portion $g$, then assumes a value of about 1.5 volts, indicated by the portion $f$ throughout the duration of the discharge. When the discharge is completed, which occurs at the end of ten hours, the voltage falls off sharply.

It may be desirable, for the charging step, to connect the accumulator with a source capable of maintaining across its terminals a potential difference somewhat higher than the limiting value of the charge voltage to be kept, e. g. 2.5 volts or 3 volts, for the charge of a silver-zinc element. A copper oxide rectifier having a low internal resistance may in this case be used. It will be understood however that a rectifier having a higher resistance may be used, e. g. a selenium-cadmium rectifier or the like, and a potentiometer interposed between the rectifier and the element to be charged.

The invention provides also, in order to further increase the capacity of the accumulator, to admit in this latter an anti-coagulating or anti-cohering substance.

This substance is advantageously a compound, preferably an oxide or hydroxide, of a metal of substantially lower atomic weight than the silver or the like, as lithia or lithium hydroxide.

The lithia is thus simply poured into the accumulator, preferably when this latter is in discharged condition so that the lithia is at once carried over onto the positive material during the next charging of the accumulator.

The invention provides also the utilization of the lithia not only in an accumulator manufactured according to the hereabove method, but more generally in an accumulator in which the negative active material and the positive active material are applied under pressure on opposite sides of a semi-permeable material.

In some circumstances, the lithia is added into the electrolyte before pouring the latter into the container.

According to a modification, the admixture of lithia takes place during the manufacture of the positive electrode, this latter being produced in forming a paste by mixing a silver powder and an aqueous solution of lithia.

Good results have been obtained by pouring into an accumulator, containing as the electrolyte 105 cc. of 45% potassium hydroxide, 20 cc. of a saturated lithia solution.

The applicant is aware that it has already been suggested to add lithia into nickel accumulators. However, it is new to apply the lithia or the like as a substance entering into the composition of the positive material of an accumulator wherein the said material as well as the negative material are applied under pressure on opposite sides of a semi-permeable material and which operates by reduction and oxidation.

Such use, moreover, secures a surprising result, for while the capacity of a nickel accumulator treated with lithia is increased by about 10%, it has been found that the application of lithia to an accumulator of the kind just specified, and especially to a silver-zinc accumulator, increases its capacity in a proportion which may range from 30% to 40%.

In Fig. 4, there is illustrated a diagram bringing into light the experiments carried out by applicant. In this diagram, time in minutes has been plotted in abscissae, and in ordinates the discharge voltages of a silver-zinc accumulator operating according to the type of operation wherein the negative electrode remains insoluble. The curve A' is the discharge curve of such an accumulator which does not contain lithia, at its third operating cycle, the discharge being effected across a constant resistance. It is found that initially the accumulator supplies a voltage of 1.2 volt, but that this voltage decreases very quickly and becomes stabilized at about 1 volt; this latter voltage is, moreover, supplied only during about thirty minutes, after which it drops off very quickly and at the end of an hour the voltage is very low.

The said accumulator thus discharged is then treated with lithia in the above-indicated manner. The next discharge curve is then the curve B'. The initial voltage is 1.5 volt; it is stabilized at a value higher than 1.2 volt for a time which exceeds fifty minutes. The discharge curve of said accumulator corresponding to the tenth cycle is the curve C'. The initial voltage approximate 1.7 volt. It becomes stabilized at a value of about 1.3 volt which it retains for a time much longer than one hour.

Another experiment conducted on the same accumulator, but into which no lithia had been added, has shown that despite repeated charges and discharges the discharge curve A' is not substantially departed from.

The use of lithia therefore has had the result of maintaining the voltage of the accumulator at a high value over a long period of time and that of increasing its capacity. Indeed, all other things remaining equal, such a lithia-containing accumulator yields an energy more than double of that of an accumulator deprived of lithia.

It is to be noted that the discharge curves of Fig. 4 relate to an accumulator obtained according to a method which is not the one hereabove defined. But the adjunction of lithia is also advantageous for an accumulator obtained by the said method. The admixture of lithia is then preferably carried out after only the second or the third formative cycle, so that the initial formative steps develop in a medium of high causticity.

I claim:

1. A method of so forming a battery having a negative zinc electrode and a positive electrode as to promote the conversion of the zinc of said negative electrode into its hydroxide, comprising an initial discharging step during which an oxide in said positive electrode is at least partly reduced and a current is generated, said current being maintained at a rate sufficient to complete the discharge of said battery within not more than one hour.

2. A method according to claim 1, including an initial charging step preceding said discharging step and proceeding at a rate substantially slower than that of said discharging step.

3. A method according to claim 2 wherein said charging step proceeds at a rate substantially twenty times slower than the rate of said discharging step.

HENRI GEORGES ANDRÉ.

REFERENCES CITED

The following references are of record in the file of this patent:

UNITED STATES PATENTS

| Number | Name | Date |
|---|---|---|
| 876,445 | Edison | Jan. 14, 1908 |
| 1,416,738 | Muren | May 23, 1922 |
| 2,317,711 | Andre | Apr. 27, 1943 |
| 2,462,998 | Ruben | Mar. 1, 1949 |

FOREIGN PATENTS

| Number | Country | Date |
|---|---|---|
| 631,126 | France | Dec. 15, 1927 |

OTHER REFERENCES

Zimmerman, Transaction of the Electro-Chemical Society, 1935, vol. 68, pp. 231–249.

Hauel, Transactions of the Electro-Chemical Society, 1939, vol. 76, pp. 444–445.